United States Patent
Hahn

(10) Patent No.: US 11,503,604 B2
(45) Date of Patent: Nov. 15, 2022

(54) METHOD FOR CONFIGURING SIDELINK RESOURCES BASED ON USER EQUIPMENT SPEED IN COMMUNICATION SYSTEM AND APPARATUS FOR THE SAME

(71) Applicants: Hyundai Motor Company, Seoul (KR); Kia Motors Corporation, Seoul (KR)

(72) Inventor: Gene Beck Hahn, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 149 days.

(21) Appl. No.: 16/558,882

(22) Filed: Sep. 3, 2019

(65) Prior Publication Data

US 2020/0077380 A1    Mar. 5, 2020

Related U.S. Application Data

(60) Provisional application No. 62/726,674, filed on Sep. 4, 2018.

(30) Foreign Application Priority Data

Aug. 14, 2019    (KR) .................. 10-2019-0099615

(51) Int. Cl.
*H04W 4/46* (2018.01)
*H04W 72/04* (2009.01)
(Continued)

(52) U.S. Cl.
CPC ........... *H04W 72/048* (2013.01); *H04W 4/46* (2018.02); *H04W 8/02* (2013.01); *H04W 88/02* (2013.01)

(58) Field of Classification Search
CPC ....... H04W 4/40; H04W 4/46; H04W 72/048; H04W 72/0406; H04W 8/02; H04W 36/32; H04W 36/0083
See application file for complete search history.

(56) References Cited

U.S. PATENT DOCUMENTS

2018/0124771 A1    5/2018    Mok et al.
2019/0082377 A1*   3/2019    Silver .............. G08G 1/096741
(Continued)

FOREIGN PATENT DOCUMENTS

| EP | 3 294 022 A1 | 3/2018 |
| EP | 3 484 191 A1 | 5/2019 |
| WO | 2018/030307 A1 | 2/2018 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14); 3GPP TS 36.300 V14.7.0 (Jun. 2018); 331 pgs.
(Continued)

*Primary Examiner* — Bo Hui A Zhu
(74) *Attorney, Agent, or Firm* — Fox Rothschild LLP

(57) ABSTRACT

A sidelink communication method performed by a UE is provided. The method includes receiving from a base station a message including zone configuration information and resource pool configuration information and selecting a zone type mapped to a speed of the UE among zone types indicated by the zone configuration information. A zone identifier is determined based on configuration information of the selected zone type, the configuration information of the selected zone type being included in the zone configuration information. The sidelink communication is performed using a resource pool mapped to the zone identifier (Continued)

among resource pools indicated by the resource pool configuration information.

12 Claims, 6 Drawing Sheets

(51) Int. Cl.
*H04W 8/02* (2009.01)
*H04W 88/02* (2009.01)

(56) References Cited

U.S. PATENT DOCUMENTS

2019/0174503 A1* 6/2019 Adachi ............... H04W 72/121
2021/0014643 A1* 1/2021 Kuroda .................... G08G 1/09

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 15); 3GPP TS 36.331 V15.2.2 (Jun. 2018); 791 pgs.
3GPP TSG RAN Meeting #80; La Jolla, USA, Jun. 11-14, 2018; For guidance, see 3GPP Working Procedures, article 39; and 3GPP TR 21.900. Information about Work Items can be found at <http://www.3gpp.org/Work-Items>; 5 pgs.

* cited by examiner

METHOD FOR CONFIGURING SIDELINK RESOURCES BASED ON USER EQUIPMENT SPEED IN COMMUNICATION SYSTEM AND APPARATUS FOR THE SAME

CROSS-REFERENCE TO RELATED APPLICATIONS

This application claims the benefit of priorities to U.S. Provisional Patent Application No. 62/726,674, filed on Sep. 4, 2018 with the U.S. Patent and Trademark Office, and Korean Patent Application No. 10-2019-0099615, filed on Aug. 14, 2019 in the Korean Intellectual Property Office (KIPO), the entire contents of which are incorporated herein by reference.

BACKGROUND

1. Technical Field

The present disclosure relates generally to sidelink communication technology, and more specifically, to a technique for configuring a resource pool based on a speed of a user equipment (UE).

2. Related Art

Various systems have been developed for processing wireless data such as the fourth-generation (4G) communication system (e.g., Long Term Evolution (LTE) communication system or LTE-Advanced (LTE-A) communication system) and the fifth-generation (5G) communication system (e.g., New Radio (NR) communication system), which uses a frequency band higher than the frequency band of the 4G communication system. The 5G communication system supports Enhanced Mobile Broadband (eMBB) communications, Ultra-Reliable and Low-Latency communications (URLLC), massive Machine Type Communications (mMTC), and the like.

The 4G communication system and 5G communication system support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication system, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications may be established, and communications between the vehicles may be performed using the sidelink channels.

Meanwhile, geographical zones may be configured for the sidelink communication, and a resource pool for each of the zones may be configured. A user equipment (UE) belonging to a zone may perform sidelink communication using a resource pool mapped to the zone. However, when the UE moves at a high speed, the zone to which the UE belongs may be changed, and thus the resource pool that the UE has to use may also be changed. Accordingly, the efficiency of the sidelink communication may deteriorate.

SUMMARY

Accordingly, exemplary embodiments of the present disclosure provide a method and an apparatus for configuring a resource pool based on a speed of user equipment (UE).

According to the exemplary embodiments of the present disclosure, a sidelink communication method performed by a UE may include receiving from a base station a message including zone configuration information and resource pool configuration information; selecting a zone type mapped to a speed of the UE among a plurality of zone types indicated by the zone configuration information; determining a zone identifier based on configuration information of the selected zone type, the configuration information of the selected zone type being included in the zone configuration information; and performing sidelink communication using a resource pool mapped to the zone identifier among resource pool(s) indicated by the resource pool configuration information.

The plurality of zone types may be classified into a high-zone and a low-zone. The high-zone and the low-zone may have different sizes, and the high-zone may be selected among the plurality of zone types when the speed of the UE is equal to or greater than a speed threshold, and the low-zone may be selected among the plurality of zone types when the speed of the UE is less than the speed threshold. The zone configuration information may include the speed threshold. The resource pool configuration information may include configuration information of resource pool(s) for the high-zone and configuration information of resource pool(s) for the low-zone.

In addition, the plurality of zone types may be classified into a high-zone, a medium-zone, and a low-zone. The high-zone, the medium-zone, and the low-zone may have different sizes, and the high-zone may be selected among the plurality of zone types when the speed of the UE is equal to or greater than a first speed threshold, the medium-zone may be selected among the plurality of zone types when the speed of the UE is less than the first speed threshold and equal to or greater than a second speed threshold, the low-zone may be selected among the plurality of zone types when the speed of the UE is less than the second speed threshold. The first speed threshold may be greater than the second speed threshold.

The message may be a system information block (SIB). The sidelink communication method may further include, before receiving the message, transmitting to the base station information regarding a position of the UE and the speed of the UE. The sidelink communication method may also include transmitting to the base station information indicating the selected zone type.

Furthermore, according to the exemplary embodiments of the present disclosure, an operation method of a base station supporting sidelink communication may include generating zone configuration information including configuration information of a plurality of zone types; generating resource pool configuration information including configuration information of resource pools for the plurality of zone types; and transmitting a message including the zone configuration information and the resource pool configuration information to a user equipment (UE), wherein sizes of zones having different zone types are different.

The plurality of zone types may be classified into a high-zone and a low-zone. The high-zone and the low-zone may have different sizes, and the high-zone may be selected among the plurality of zone types when the speed of the UE is equal to or greater than a speed threshold, and the low-zone may be selected among the plurality of zone types when the speed of the UE is less than the speed threshold. The zone configuration information may include the speed threshold. The resource pool configuration information may include configuration information of resource pool(s) for the high-zone and configuration information of resource pool(s) for the low-zone.

In addition, the plurality of zone types may be classified into a high-zone, a medium-zone, and a low-zone. The high-zone, the medium-zone, and the low-zone may have different sizes, the high-zone may be selected among the plurality of zone types when the speed of the UE is equal to or greater than a first speed threshold, the medium-zone may be selected among the plurality of zone types when the speed of the UE is less than the first speed threshold and equal to or greater than a second speed threshold, the low-zone may be selected among the plurality of zone types when the speed of the UE is less than the second speed threshold, and the first speed threshold may be greater than the second speed threshold. The operation method may further include receiving from the UE information indicating the zone type selected by the UE among the plurality of zone types.

Furthermore, according to the exemplary embodiments of the present disclosure, a sidelink communication method performed by a UE may include transmitting a first message to a base station, the first message including information regarding a position and a speed of the UE; receiving a second message from the base station, the second message including zone configuration information including configuration information of a zone type selected based on the speed of the UE among a plurality of zone types and resource pool configuration information including configuration information of resource pool(s) for the selected zone type; determining a zone identifier based on the zone configuration information; and performing sidelink communication using a resource pool mapped to the zone identifier among resource pool(s) indicated by the resource pool configuration information.

The plurality of zone types may be classified into a high-zone and a low-zone. The high-zone and the low-zone may have different sizes, the high-zone may be selected among the plurality of zone types when the speed of the UE is equal to or greater than a speed threshold, and the low-zone may be selected among the plurality of zone types when the speed of the UE is less than the speed threshold.

In addition, the plurality of zone types may be classified into a high-zone, a medium-zone, and a low-zone. The high-zone, the medium-zone, and the low-zone may have different sizes, the high-zone may be selected among the plurality of zone types when the speed of the UE is equal to or greater than a first speed threshold, the medium-zone may be selected among the plurality of zone types when the speed of the UE is less than the first speed threshold and equal to or greater than a second speed threshold, the low-zone may be selected among the plurality of zone types when the speed of the UE is less than the second speed threshold, and the first speed threshold may be greater than the second speed threshold.

The second message may be a radio resource control (RRC) connection reconfiguration message.

Furthermore, according to the exemplary embodiments of the present disclosure, an operation method of a base station supporting sidelink communication may include receiving a first message from a user equipment (UE), the first message including information regarding a position and a speed of the UE; selecting a zone type mapped to the speed of the UE among a plurality of zone types; configuring resource pool(s) for the selected zone type; and transmitting to the UE a second message including zone configuration information including configuration information of the selected zone type and resource pool configuration information including configuration information of the resource pool(s), wherein sizes of zones having different zone types are different.

The plurality of zone types may be classified into a high-zone and a low-zone. The high-zone and the low-zone have different sizes, the high-zone may be selected among the plurality of zone types when the speed of the UE is equal to or greater than a speed threshold, and the low-zone may be selected among the plurality of zone types when the speed of the UE is less than the speed threshold.

In addition, the plurality of zone types may be classified into a high-zone, a medium-zone, and a low-zone. The high-zone, the medium-zone, and the low-zone may have different sizes, the high-zone may be selected among the plurality of zone types when the speed of the UE is equal to or greater than a first speed threshold, the medium-zone may be selected among the plurality of zone types when the speed of the UE is less than the first speed threshold and equal to or greater than a second speed threshold, the low-zone may be selected among the plurality of zone types when the speed of the UE is less than the second speed threshold, and the first speed threshold may be greater than the second speed threshold.

Additionally, according to the exemplary embodiments of the present disclosure, a UE performing sidelink communication in a communication system may include a processor, a transceiver operated by the processor, and a memory configured to store at least one instruction executable by the processor. When executed by the processor, the at least one instruction may be configured to receive from a base station a message including zone configuration information and resource pool configuration information; select a zone type mapped to a speed of the UE among a plurality of zone types indicated by the zone configuration information; determine a zone identifier based on configuration information of the selected zone type, the configuration information of the selected zone type being included in the zone configuration information; and perform a sidelink communication using a resource pool mapped to the zone identifier among resource pool(s) indicated by the resource pool configuration information.

The plurality of zone types may be classified into a high-zone and a low-zone. The high-zone and the low-zone may have different sizes, the high-zone may be selected among the plurality of zone types when the speed of the UE is equal to or greater than a speed threshold, and the low-zone may be selected among the plurality of zone types when the speed of the UE is less than the speed threshold. The resource pool configuration information may include configuration information of resource pool(s) for the high-zone and configuration information of resource pool(s) for the low-zone. The at least one instruction may be further configured to transmit information indicating the selected zone type to the base station.

Furthermore, according to the exemplary embodiments of the present disclosure, a base station supporting sidelink communication in a communication system may include a processor, a transceiver operated by the processor, and a memory configured to store at least one instruction executable by the processor. When executed by the processor, the at least one instruction may be configured to generate zone configuration information including configuration information of a plurality of zone types; generate resource pool configuration information including configuration information of resource pools for the plurality of zone types; and transmit a message including the zone configuration information and the resource pool configuration information to a user equipment (UE), wherein sizes of zones having different zone types are different.

Additionally, according to the exemplary embodiments of the present disclosure, a UE performing sidelink communication in a communication system may include a processor, a transceiver operated by the processor, and a memory configured to store at least one instruction executable by the processor. Additionally, when executed by the processor, the at least one instruction may be configured to transmit a first message to a base station, the first message including information regarding a position and a speed of the UE; receive a second message from the base station, the second message including zone configuration information including configuration information of a zone type selected based on the speed of the UE among a plurality of zone types and resource pool configuration information including configuration information of resource pool(s) for the selected zone type; determine a zone identifier based on the zone configuration information; and perform sidelink communication using a resource pool mapped to the zone identifier among resource pool(s) indicated by the resource pool configuration information.

The plurality of zone types may be classified into a high-zone and a low-zone. The high-zone and the low-zone may have different sizes, the high-zone may be selected among the plurality of zone types when the speed of the UE is equal to or greater than a speed threshold, and the low-zone may be selected among the plurality of zone types when the speed of the UE is less than the speed threshold. The second message may be a radio resource control (RRC) connection reconfiguration message.

Furthermore, according to the exemplary embodiments of the present disclosure, a base station supporting sidelink communication in a communication system may include a processor, a transceiver operated by the processor, and a memory configured to store at least one instruction executable by the processor. Additionally, when executed by the processor, the at least one instruction may be configured to receive a first message from a user equipment (UE), the first message including information regarding a position and a speed of the UE; select a zone type that is mapped to the speed of the UE among a plurality of zone types; configure resource pool(s) for the selected zone type; and transmit to the UE a second message including zone configuration information including configuration information of the selected zone type and resource pool configuration information including configuration information of the resource pool(s), wherein sizes of zones having different zone types are different.

In accordance with the exemplary embodiments of the present disclosure, the base station may include a plurality of zone types (e.g., high-zone, medium-zone, and low-zone), and may be configured to transmit configuration information of the zone types to the UE. The sizes of the high-zone, medium-zone, and low-zone may be different. The UE may be configured to receive the configuration information of the zone types from the base station, determined a zone type based on the current speed of the UE, determine a zone identifier based on the determined zone type, and perform sidelink communication using a resource pool mapped to the zone identifier.

Alternatively, the base station may be configured to select one zone type that corresponds to the speed of the UE among the plurality of zone types, and transmit configuration information of the selected zone type to the UE. The UE may also be configured to receive the configuration information from the base station, determine a zone identifier based on the configuration information, and perform sidelink communication using a resource pool mapped to the zone identifier.

Since the size of the zone, which is used by the UE, varies based on the speed of the UE, the UE moving at a high speed may perform sidelink communication using the resource pool mapped to the corresponding zone (e.g., a zone having a relatively large size). Therefore, the sidelink communication may be performed more efficiently, and thus the performance of the communication system may be improved.

BRIEF DESCRIPTION OF DRAWINGS

Exemplary embodiments of the present disclosure will become more apparent by describing in detail exemplary embodiments of the present disclosure with reference to the accompanying drawings, in which.

Figure 1:
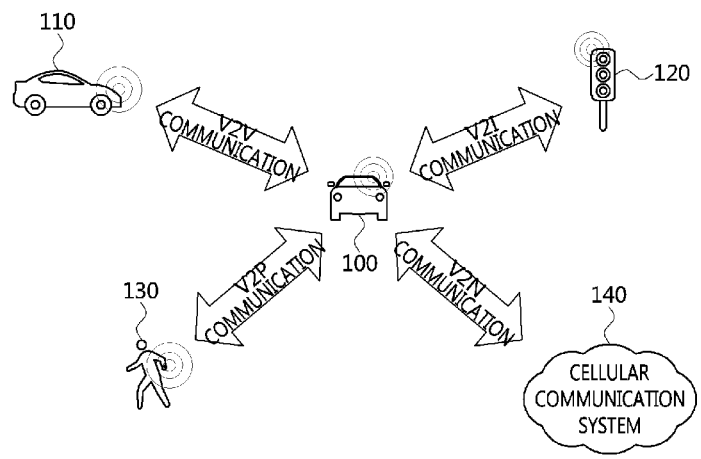
FIG. 1 is a conceptual diagram illustrating V2X communication scenarios according to an exemplary embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" or "controller" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, exemplary embodiments of the present disclosure will be described in greater detail with reference to the accompanying drawings. To facilitate general understanding in describing the present disclosure, the same components in the drawings are denoted with the same reference signs, and repeated description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Particularly, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located within the vehicle 100 (e.g., the first vehicle)) and a second vehicle 110 (e.g., a communication node located within the vehicle 110 (e.g., the second vehicle)). Various driving information such as velocity, heading, time, position, and the like may be exchanged between the vehicles 100 and 110 via the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located within the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node mounted within the vehicle 100 or the communication node carried by the person 130 may be configured to generate an alarm that indicates a danger by detecting a dangerous situation based on the obtained driving information and movement information. The V2P communications supported in the cellular communication system 140 may be performed based on sidelink communication technologies (e.g., ProSe and D2D communication technologies, and the like). In particular, the communications between the communication node mounted within the vehicle 100 and the communication node carried by the person 130 may be performed using at least one sidelink channel established between the communication nodes.

The V2N communications may be communications between the first vehicle 100 (e.g., the communication node located in the vehicle 100) and a server connected via the cellular communication system 140. The V2N communications may be performed based on the 4G communication technology (e.g., LTE or LTE-A) or the 5G communication technology (e.g., NR). In addition, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Figure 2:
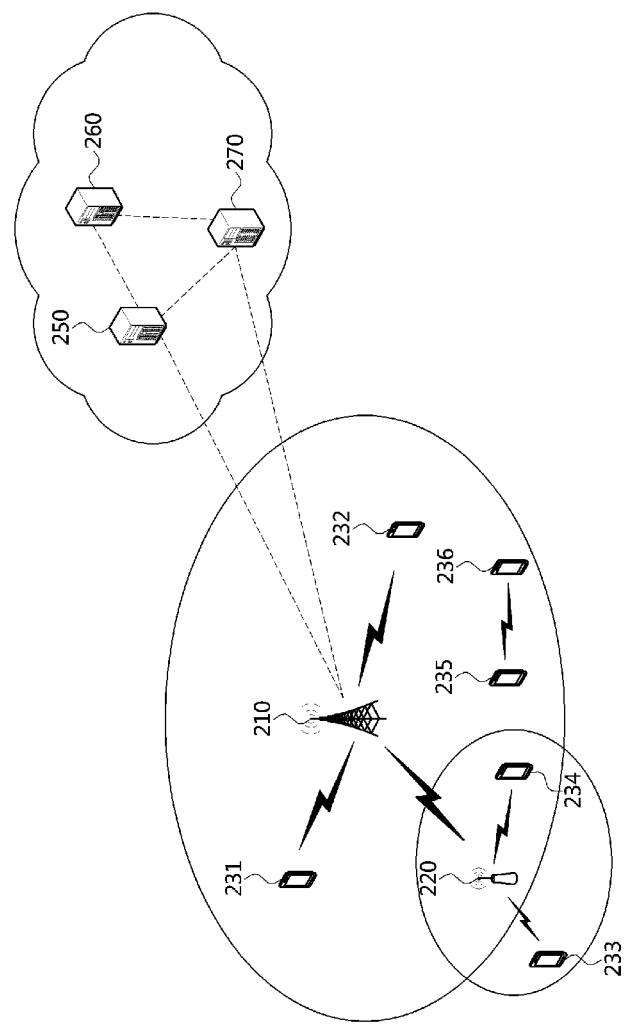
FIG. 2 is a conceptual diagram illustrating a cellular communication system according to an exemplary embodiment of the present disclosure.

Moreover, the cellular communication system 140 that supports the V2X communications may be configured as follows. FIG. 2 is a conceptual diagram illustrating exemplary embodiments of a cellular communication system. As shown in FIG. 2, a cellular communication system may include an access network, a core network, and the like. The access network may include a base station 210, a relay 220, User Equipment (UEs) 231 through 236, and the like. The UEs 231 through 236 may include communication nodes mounted within the vehicles 100 and 110 of FIG. 1, the communication node mounted within the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Additionally, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may be configured to perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier PUMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

Figure 3:
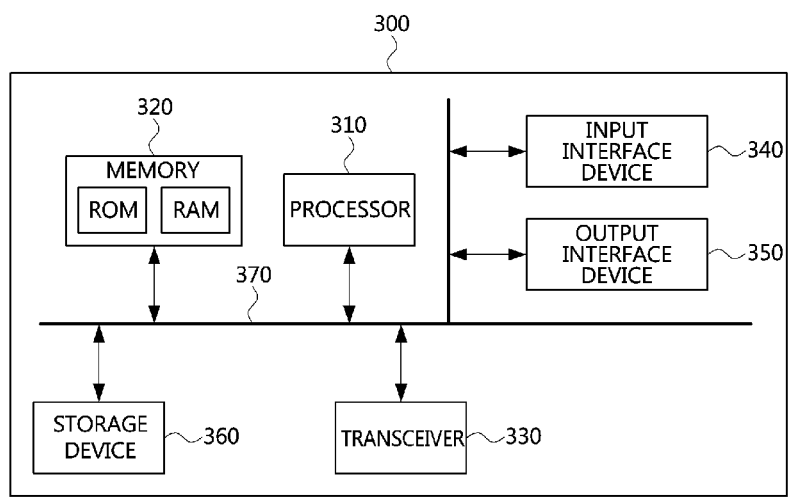
FIG. 3 is a conceptual diagram illustrating a communication node constituting a cellular communication system according to an exemplary embodiment of the present disclosure.

The communication nodes (e.g., base station, relay, UE, S-GW, P-GW, MME, UPF, SMF, AMF, etc.) including the cellular communication system may be configured as follows. FIG. 3 is a conceptual diagram illustrating exemplary embodiments of a communication node constituting a cellular communication system. As shown in FIG. 3, a communication node 300 may include at least one processor 310, a memory 320, and a transceiver 330 connected to a network for performing communications. Additionally, the communication node 300 may further include an input interface device 340, an output interface device 350, a storage device 360, and the like. Each component included in the communication node 300 may be configured to communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with exemplary embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and transmit signals received from the UEs 231 through 236 and the relay 220 to the core network. The UEs 231, 232, 234, 235 and 236 may be part of cell coverage of the base station 210. The UEs 231, 232, 234, 235 and 236 may be connected to the base station 210 by performing a connection establishment procedure with the base station 210. The UEs 231, 232, 234, 235 and 236 may be configured to communicate with the base station 210 after being connected to the base station 210.

The relay 220 may be connected to the base station 210 and may be configured to relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be disposed outside the cell coverage of the base station 210. The UEs 233 and 234 may be connected to the relay 220 by performing a connection establishment procedure with the relay 220. The UEs 233 and 234 may be configured to communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may be configured to perform operations that correspond to the base station 210 and operations supported by the base station 210. The UEs 233 and 234 may be configured to perform operations that correspond to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node mounted within the first vehicle 100 of FIG. 1 and the UE 236 may be the communication node mounted within the second vehicle 110 of FIG. 1. When V2I communications are performed using the sidelink communication technique, the UE 235 may be the communication node mounted within first vehicle 100 of FIG. 1 and the UE 236 may be the communication node mounted within the infrastructure 120 of FIG. 1. When V2P communications are performed using the sidelink communication technique, the UE 235 may be the communication node mounted within first vehicle 100 of FIG. 1 and the UE 236 may be the communication node carried by the person 130 of FIG. 1.

The scenarios to which the sidelink communications are applied may be classified as shown below in Table 1 based on the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Figure 4:
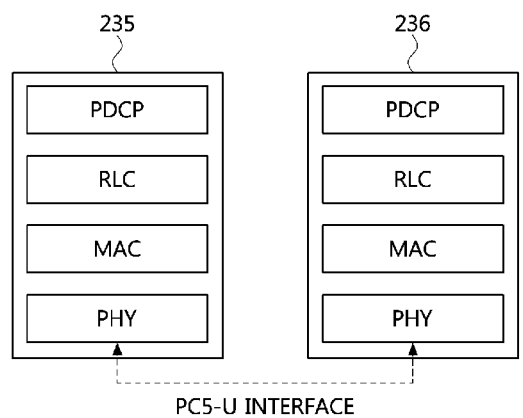
FIG. 4 is a block diagram illustrating a user plane protocol stack of an UE performing sidelink communication according to an exemplary embodiment of the present disclosure.

Meanwhile, a user plane protocol stack of the UEs (e.g., the UEs 235 and 236) performing sidelink communications may be configured as follows. FIG. 4 is a block diagram illustrating exemplary embodiments of a user plane protocol stack of an UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an identification (ID) configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported.

Figure 5:
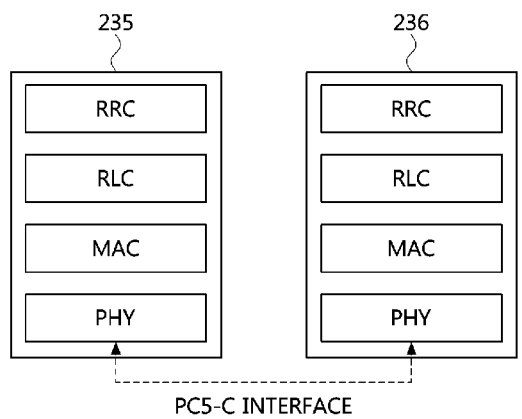
FIG. 5 is a block diagram illustrating a control plane protocol stack of an UE performing sidelink communication according to an exemplary embodiment of the present disclosure.
Figure 6:
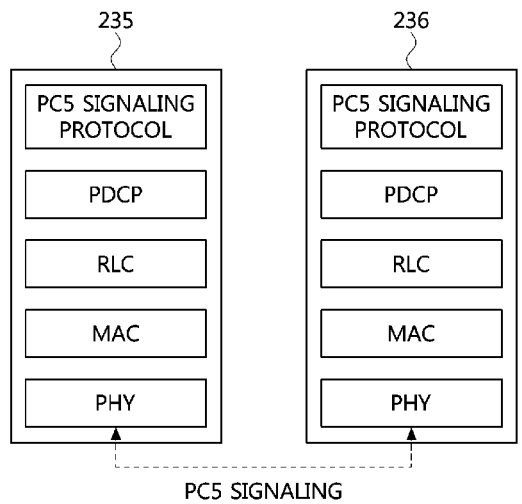
FIG. 6 is a block diagram illustrating a control plane protocol stack of an UE performing sidelink communication according to an exemplary embodiment of the present disclosure.

Moreover, a control plane protocol stack of the UEs (e.g., the UEs 235 and 236) performing sidelink communications may be configured as follows. FIG. 5 is a block diagram illustrating a first exemplary embodiment of a control plane protocol stack of an UE performing sidelink communication, and FIG. 6 is a block diagram illustrating a second exemplary embodiment of a control plane protocol stack of an UE performing sidelink communication. As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Further, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). In addition, a demodulation reference signal (DM-RS), a synchronization signal, or the like may be used in the sidelink communications between the UEs 235 and 236. A sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may be configured to perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure, etc.). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. Particularly, the sidelink control information may be transmitted via resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In particular, the sidelink control information may be transmitted via resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In particular, the sidelink data may be transmitted and received via resources scheduled by the base station 210. When the sidelink TM 4 is supported, the resource pool for transmitting and receiving sidelink data may be configured by a dedicated RRC signaling procedure or a broadcast RRC signaling procedure. Particularly, the sidelink data may be transmitted and received via resources selected autonomously by the UE (e.g., UE 235 or 236) within the resource pool configured by the dedicated RRC signaling procedure or the broadcast RRC signaling procedure.

Hereinafter, methods for configuring sidelink resources will be described. Even when a method (e.g., transmission or reception of a signal) to be performed at a first communication node among communication nodes is described, a corresponding second communication node may be configured to perform a method (e.g., reception or transmission of the signal) that corresponds to the method performed at the first communication node. In other words, when an operation of a UE #1 (e.g., first vehicle) is described, a corresponding UE #2 (e.g., second vehicle) may be configured to perform an operation that corresponds to the operation of the UE #1. Conversely, when an operation of the UE #2 (e.g., second vehicle) is described, the corresponding UE #1 (e.g., first vehicle) may be configured to perform an operation that corresponds to the operation of the UE #2. In the exemplary embodiments described below, the operation of the vehicle may be the operation of the communication node mounted within the vehicle.

The geographical zones for sidelink communication may be configured and a resource pool for each of the zones may be configured. The zone types may be classified based on the speed of the UE speed, and may be classified in two schemes. For example, the zone types may be classified into a high-zone, a medium-zone, and a low-zone. The high-zone may also be referred to as a 'first zone', the medium-zone may also be referred to as a 'second zone', and the low-zone may also be referred to as a 'third zone'.

In a scheme #1, the base station may configure zone types (e.g., 'high-zone and low-zone' or 'high-zone, medium-zone, and low-zone'), and may be configured to transmit configuration information of the zone types (referred to as 'zone configuration information') to the UE. The UE may then be configured to select one zone type among the zone types configured by the base station based on a current speed. In a scheme #2, the base station may configure one zone type based on the current speed of the UE, and may be configured to transmit configuration information of the one zone type to the UE. The UE may use the one zone type configured by the base station.

Sidelink Communication Method Based on the Scheme #1

Figure 7:
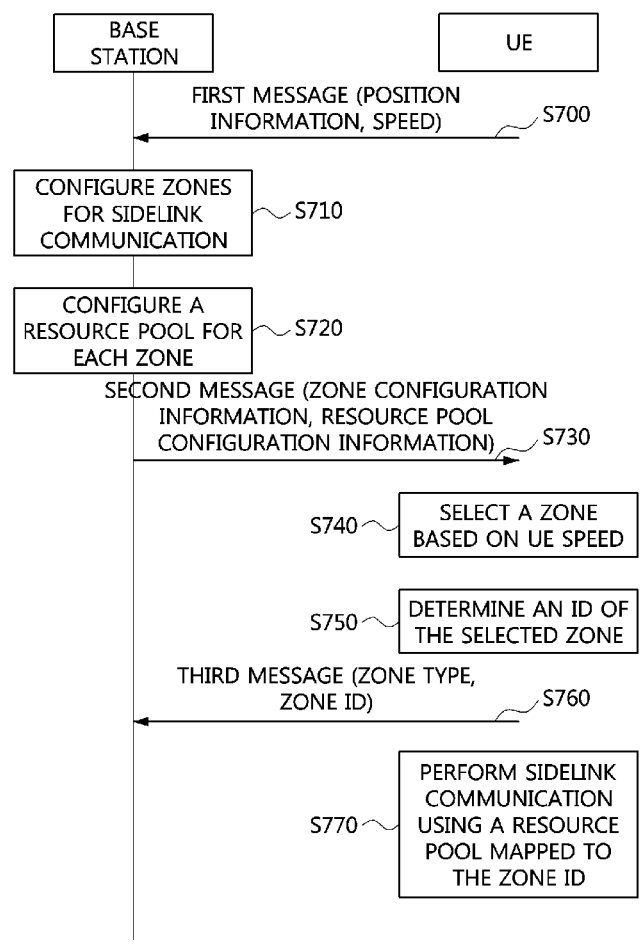
FIG. 7 is a sequence chart illustrating a first exemplary embodiment of a sidelink communication method in a communication system.

FIG. 7 is a sequence chart illustrating a first exemplary embodiment of a sidelink communication method in a communication system. As shown in FIG. 7, a communication system may include a base station and a UE. The base station may be a base station belonging to the cellular communication system 140 shown in FIG. 1, and the UE may be a UE mounted within the vehicle 100 shown in FIG. 1. For example, the base station may be the base station 210 shown in FIG. 2, and the UE may be one of the UEs 231 to 236 shown in FIG. 2. Each of the base station and the UE may be configured to be the same as or similar to the communication node 300 shown in FIG. 3. The UE may support the protocol stacks shown in FIGS. 4 to 6.

A UE (e.g., UE operating in a RRC connected state) may be configured to periodically transmit a first message to the base station, which includes at least one of information regarding a position, a speed, and an acceleration of the UE (S700). The position may indicate a longitude and a latitude of a current position of the UE. For example, the position may be a geographical coordinate of the current position of the UE. The speed may indicate a current speed of the UE, and may include a horizontal speed and a vertical speed. The acceleration may indicate a change rate of the UE's speed. The first message may be UE assistance information, a radio resource measurement (RRM) report message, sidelink UE information, or uplink control information (UCI). Alternatively, the first message may be transmitted to the base station aperiodically. For example, the UE may be configured to transmit the first message to the base station in response to a request from the base station.

The base station may be configured to receive the first message from the UE, and identify one or more of the position, the speed, and the acceleration included in the first message. The base station may configure geographic zones for sidelink communication (S710). Different zone types classified based on toe a UE speed may be configured. For example, a high-zone for a UE with a speed equal to or greater than a UE speed threshold may be configured, and a low-zone for a UE with a speed less than the UE speed threshold may be configured. The base station may be configured to generate configuration information of the high-zone and the low-zone. The configuration information (i.e., zone configuration information) may be defined as shown in Table 3 below. In other words, the configuration information may include information on the two zone types (e.g., high-zone and low-zone).

TABLE 3

| Information element | | Description |
| --- | --- | --- |
| UE speed threshold | | The UE uses the high-zone when the UE speed is equal to or higher than the UE speed threshold, and uses the low-zone when the UE speed is lower than the UE speed threshold. |
| High-zone | Length | The length of each of high-zones |
| | Width | The width of each of high-zones |
| | Longitude information | The total number of high-zones configured in the longitudinal direction |
| | Latitude information | The total number of high-zones configured in the latitudinal direction |
| Low-zone | Length | The length of each of low-zones |
| | Width | The width of each of low-zones |
| | Longitude information | The total number of low-zones configured in the longitudinal direction |
| | Latitude information | The total number of low-zones configured in the latitudinal direction |

The length of the high-zone may be greater than the length of the low-zone, and the width of the high-zone may be greater than the width of the low-zone. Thus, the total number of high-zones configured in the longitudinal direction may be less than the total number of low-zones configured in the longitudinal direction. The total number of high-zones configured in the latitudinal direction may be less than the total number of low-zones configured in the latitudinal direction. The length of each of the high-zone and low-zone may be configured in units of 5 m. For example, the length of each of the high-zone and low-zone may be configured to be 5 m, 10 m, 15 m, 20 m, 25 m, 30 m, or the like. The width of each of the high-zone and the low-zone may be configured in units of 5 m. For example, the width of each of the high-zone and the low-zone may be configured to be 5 m, 10 m, 15 m, 20 m, 25 m, 30 m, or the like.

Alternatively, the zone types may be classified into high-zone, medium-zone, and low-zone based on the UE speed. In particular, a UE speed threshold1 and a UE speed threshold2 may be configured. The speed indicated by the UE speed threshold1 may be greater than the speed indicated by the UE speed threshold2. A high-zone for a UE with a speed equal to or greater than the UE speed threshold1 may be configured. A medium-zone for a UE having a speed less than the UE speed threshold1 and equal to or greater than the UE speed threshold2 may be configured. A low-zone for a UE having a speed less than the UE speed threshold2 may be configured. The configuration information may be defined as shown in Table 4 below. In other words, the configuration information may include information on three zone types (e.g., high-zone, medium-zone, and low-zone).

TABLE 4

| Information element | | Description |
| --- | --- | --- |
| UE speed threshold1 | | The UE uses the high-zone when the UE speed is equal to or higher than the UE speed threshold1. |
| UE speed threshold2 | | The UE uses the medium-zone when the UE speed is lower than the UE speed threshold1 and equal to or higher than the UE speed threshold2. |
| | | The UE uses the low-zone when the UE speed is lower than the UE speed threshold2. |
| High-zone | Length | The length of each of high-zones |
| | Width | The width of each of high-zones |
| | Longitude information | The total number of high-zones configured in the longitudinal direction |
| | Latitude information | The total number of high-zones configured in the latitudinal direction |
| Medium-zone | Length | The length of each of medium-zones |
| | Width | The width of each of medium-zones |
| | Longitude information | The total number of medium-zones configured in the longitudinal direction |
| | Latitude information | The total number of medium-zones configured in the latitudinal direction |
| Low-zone | Length | The length of each of low-zones |
| | Width | The width of each of low-zones |
| | Longitude information | The total number of low-zones configured in the longitudinal direction |
| | Latitude information | The total number of low-zones configured in the latitudinal direction |

The length of the high-zone may be greater than the length of the medium-zone, and the length of the medium-zone may be greater than the length of the low-zone. The width of the high-zone may be greater than the width of the medium-zone, and the width of the medium-zone may be greater than the width of the low-zone. Thus, the total number of high-zones configured in the longitudinal direction may be less than the total number of medium-zones configured in the longitudinal direction, and the total number of medium-zones configured in the longitudinal direction may be less than the total number of low-zones configured in the longitudinal direction. The total number of high-zones configured in the latitudinal direction may be less than the total number of medium-zones configured in the latitudinal direction, and the total number of medium-zones configured in the latitudinal direction may be less than the total number of low-zones configured in the latitudinal direction.

The length of each of the high-zone, the medium zone, and low-zone may be configured in units of 5 m. For example, the length of each of the high-zone, the medium zone, and low-zone may be configured to be 5 m, 10 m, 15 m, 20 m, 25 m, 30 m, or the like. The width of each of the high-zone, the medium-zone, and the low-zone may be configured in units of 5 m. For example, the width of each of the high-zone, the medium-zone, and the low-zone may be configured to be 5 m, 10 m, 15 m, 20 m, 25 m, 30 m, or the like.

On the other hand, when the configuration of the zones is completed, the base station may configure one or more resource pools for each of the zones (S720). The configuration information of the resource pool (referred to as 'resource pool configuration information') may be defined as shown in Table 5 below.

TABLE 5

| Information element | Description |
| --- | --- |
| Time information | indicate time resources (e.g., number of slots or subframes, offset, etc.) constituting the resource pool |
| Frequency information | indicate frequency resources (e.g., number of subchannels, a staring resource block (RB) of the subchannels, a starting RB of a PSCCH, etc.) constituting the resource pool |
| Zone identifier (ID) | Zone ID mapped to the resource pool |

The configuration information of the resource pool may further include information elements (e.g., data transmission parameters, a channel busy ratio (CBR) threshold, a pool reporting identifier (ID), etc.) other than the information elements defined in Table 5. The zone ID may be configured differently for each of the zones. The zone ID may be determined based on Equation 1 below.

$$x_1 = \text{Floor}\left(\frac{x}{L}\right) \bmod N_x$$
$$y_1 = \text{Floor}\left(\frac{y}{W}\right) \bmod N_y$$
$$\text{zone } ID = y_1 * N_x + x_1$$

Equation 1 wherein L may be the length as defined in Table 3 or Table 4; W may be the width as defined in Table 3 or Table 4; $N_x$ may be the longitude information defined in Table 3 or Table 4; $N_y$ may be the latitude information defined in Table 3 or Table 4; x may be a geographical distance between the current position of the UE and a geographical coordinate (0, 0) in the longitudinal axis; and y may be a geographical distance between the current position of the UE and the geographical coordinate (0, 0) in the latitudinal axis. Additionally, x and y may be expressed in meters. Thus, each of the zones configured by the base station (e.g., high-zone, medium-zone, low-zone) may have a different zone ID.

The base station may be configured to transmit a second message that includes the configuration information of the zones (i.e., zone configuration information) and the configuration information of the resource pools (i.e., resource pool configuration information) to the UE (S730). The second message may be transmitted via one or more of system information, an RRC message, a MAC control element (CE), and downlink control information (DCI). For example, the second message may be a system information block (SIB) 21. The zone configuration information may be the configuration information defined in Table 3 or the configuration information defined in Table 4.

When the configuration information defined in Table 3 is included in the second message, the second message may include configuration information of one or more resource pools for the high-zones and configuration information of one or more resource pools for the low-zones. When the configuration information defined in Table 4 is included in the second message, the second message may include configuration information of one or more resource pools for the high-zones, configuration information of one or more resource pools for the medium-zones, and configuration information of one or more resource pools for the low-zones.

The UE may be configured to receive the second message from the base station, and identify the zone configuration information and the resource pool configuration information which are included in the second message. The UE may be configured to select one of the zone types indicated by the second message based on its current speed (S740). When the zone configuration information includes a single UE speed threshold, the UE may be configured to compare a current speed thereof to the UE speed threshold. When the current speed of the UE is equal to or greater than the UE speed threshold, the UE may be configured to select the high-zone. When the current speed of the UE is less than the UE speed threshold, the UE may be configured to select the low-zone.

When the zone configuration information includes two UE speed thresholds (i.e., UE speed threshold1 and UE speed threshold2), the UE may be configured to compare a current speed thereof to the UE speed threshold1 and the UE speed threshold2. When the current speed of the UE is greater than or equal to the UE speed threshold1, the UE may be configured to select the high-zone. When the current speed of the UE is less than the UE speed threshold1 and equal to or greater than the UE speed threshold2, the UE may be configured to select the medium-zone. When the current speed of the UE is less than the UE speed threshold2, the UE may be configured to select the low-zone.

The UE may be configured to determine an ID of the selected zone (S750). For example, the UE may be configured to determine the zone ID using Equation 1. In particular, the variables L, W, $N_x$, and $N_y$ in Equation 1 may be obtained from the zone configuration information included in the second message. In Equation 1, x and y may be calculated based on the current position of the UE and the geographical coordinate (0, 0). The UE may be configured to transmit a third message including at least one of the zone type selected at the step S740 and the zone ID determined at the step S750 to the base station (S760). The third message may be a physical uplink shared channel (PUSCH), sidelink UE information, or a UCI. The base station may be configured to receive the third message from the UE and identify the zone type and/or the zone ID determined by the UE based on the information included in the third message. Here, the step S760 may be omitted.

The UE may be configured to select a resource pool mapped to the zone ID determined in the step S750 among the resource pools indicated by the second message, and perform sidelink communication with another UE using the selected resource pool (S770). Since the resource pool configuration information includes zone IDs corresponding to resource pools, the UE may be configured to identify the configuration information including the same zone ID as the zone ID determined in the step S750, and perform the sidelink communication using the resource pool corresponding to the configuration information.

Sidelink Communication Method Based on the Scheme #2

Figure 8:
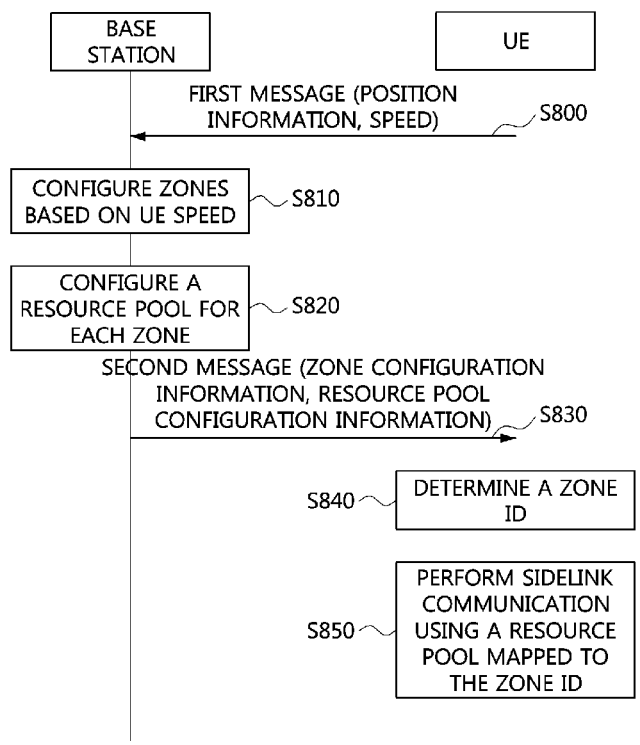
FIG. 8 is a sequence chart illustrating a second exemplary embodiment of a sidelink communication method in a communication system.

FIG. 8 is a sequence chart illustrating a second exemplary embodiment of a sidelink communication method in a communication system. As shown in FIG. 8, a communication system may include a base station and a UE. The base station may be a base station belonging to the cellular communication system 140 shown in FIG. 1, and the UE may be a UE located in the vehicle 100 shown in FIG. 1. For example, the base station may be the base station 210 shown in FIG. 2, and the UE may be one of the UEs 231 to 236 shown in FIG. 2. Each of the base station and the UE may be configured to be the same as or similar to the communication node 300 shown in FIG. 3. The UE may support the protocol stacks shown in FIGS. 4 to 6.

A UE (e.g., a UE operating in the RRC connected state) may be configured to periodically transmit a first message to the base station, that includes at least one of information regarding a position, a speed, and an acceleration of the UE (S800). The position may indicate a longitude and a latitude of the UE's current position. For example, the position may be a geographical coordinate of the current position of the UE. The speed may indicate a current speed of the UE, and may include a horizontal speed and a vertical speed. The acceleration may indicate a change rate of the UE's speed. The first message may be UE assistance information, an RRM report message, sidelink UE information, or a UCI. Alternatively, the first message may be transmitted to the base station aperiodically. For example, the UE may be configured to transmit the first message to the base station at a request of the base station.

The base station may be configured to receive the first message from the UE, and identify one or more of the position, the speed, and the acceleration included in the first message. The base station may configure zones based on the speed of the UE (S810). When a single UE speed threshold is used, the base station may be configured to compare the UE speed indicated by the first message to the UE speed threshold. When the speed of the UE is equal to or greater than the UE speed threshold, the base station may configure the high-zones. When the speed of the UE is less than the UE speed threshold, the base station may configure the low-zones.

When two UE speed thresholds (i.e., UE speed threshold1 and UE speed threshold2) are used, the base station may be configured to compare the UE speed indicated by the first message to the UE speed threshold1 and the UE speed threshold2. When the speed of the UE is equal to or greater than the UE speed threshold1, the base station may configure the high-zones. When the speed of the UE is less than the UE speed threshold1 and equal to or greater than the UE speed threshold2, the base station may configure the medium-zones. When the speed of the UE is less than the UE speed threshold2, the base station may configure the low-zones.

The length of the high-zone may be greater than the length of the medium-zone, and the length of the medium-zone may be greater than the length of the low-zone. The length of each of the high-zone, the medium-zone, and the low-zone may be configured in units of 5 ms. The width of the high-zone may be greater than the width of the medium-zone, and the width of the medium-zone may be greater than the width of the low-zone. The width of each of the high-zone, the medium-zone, and the low-zone may be configured in units of 5 ms.

Thus, the total number of high-zones configured in the longitudinal direction may be less than the total number of medium-zones configured in the longitudinal direction, and the total number of medium-zones configured in the longitudinal direction may be less than the total number of low-zones configured in the longitudinal direction. The total number of high-zones configured in the latitudinal direction may be less than the total number of medium-zones configured in the latitudinal direction, and the total number of medium-zones configured in the latitudinal direction may be less than the total number of low-zones configured in the latitudinal direction.

The configuration information of the zones (i.e., zone configuration information) determined by the base station may be defined as shown in Table 6 below. In other words, the configuration information may include information on the zones configured according to the selected zone type (e.g., high-zone, medium-zone, or low-zone).

TABLE 6

| Information element | Description |
| --- | --- |
| Length | The length of each of zones |
| Width | The width of each of zones |
| Longitude information | The total number of zones configured in the longitudinal direction |
| Latitude information | The total number of zones configured in the latitudinal direction |

When the configuration of the zones is completed, the base station may configure a resource pool for each of the zones (S820). The configuration information of the resource pool (i.e., resource pool configuration information) may be defined as shown in Table 5. The zone ID may be determined based on Equation 1. The resource pool configuration information may further include information elements (e.g., data transmission parameters a CBR threshold, a pool reporting ID, etc.) other than the information elements defined in Table 5.

The base station may be configured to transmit a second message including the zone configuration information and the resource pool configuration information to the UE (S830). The second message may be transmitted via one or more of system information, an RRC message, a MAC CE, and a DCI. For example, the second message may be an RRC connection reconfiguration message. Alternatively, the second message may be an SIB 21. The zone configuration information may be the configuration information defined in Table 6, and the resource pool configuration information may be the configuration information defined in Table 5.

The UE may be configured to receive the second message from the base station, and identify the zone configuration information and the resource pool configuration information, included in the second message. The UE may be configured to determine a zone ID based on the zone configuration information (S840). For example, the UE may be configured to determine the zone ID using Equation 1. In particular, the variables L, W, $N_x$, and $N_y$ in Equation 1 may be obtained from the zone configuration information included in the second message. In Equation 1, x and y may be calculated based on the current position of the UE and the geographical coordinate (0, 0).

The UE may be configured to select a resource pool mapped to the zone ID determined in the step S840 among the resource pools indicated by the second message, and perform sidelink communication with another UE using the selected resource pool (S770). Since the resource pool configuration information includes zone IDs corresponding to resource pools, the UE may be configured to identify the configuration information including the same zone ID as the zone ID determined in the step S840, and the sidelink communication using the resource pool corresponding to the configuration information.

The exemplary embodiments of the present disclosure may be implemented as program instructions executable by a variety of computers and recorded on non-transitory a computer readable medium. The non-transitory computer readable medium may include a program instruction, a data file, a data structure, or a combination thereof. The program instructions recorded on the non-transitory computer readable medium may be designed and configured specifically for the present disclosure or may be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A sidelink communication method performed by a user equipment (UE), comprising:
    receiving, by a controller, from a base station a message that includes zone configuration information and resource pool configuration information;
    selecting, by the controller, a zone type mapped to a speed of the UE among a plurality of zone types indicated by the zone configuration information;
    determining, by the controller, a zone identifier based on configuration information of the selected zone type, the configuration information of the selected zone type being included in the zone configuration information;
    transmitting, by the controller, to the base station the selected zone type and the determined zone identifier; and
    performing, by the controller, sidelink communication using a resource pool mapped to the determined zone identifier among resource pool(s) indicated by the resource pool configuration information,
    wherein the plurality of zone types have different zone-sizes, and a zone-size of the selected zone type is different from a zone-size of other zone type except for the selected zone type among the plurality of zone types.

2. The sidelink communication method according to claim 1, wherein the plurality of zone types are classified into a high-zone and a low-zone, the high-zone and the low-zone have different sizes, the high-zone is selected among the plurality of zone types when the speed of the UE is equal to or greater than a speed threshold, and the low-zone is selected among the plurality of zone types when the speed of the UE is less than the speed threshold.

3. The sidelink communication method according to claim 2, wherein the zone configuration information includes the speed threshold.

4. The sidelink communication method according to claim 2, wherein the resource pool configuration information includes configuration information of resource pools for the high-zone and configuration information of resource pools for the low-zone.

5. The sidelink communication method according to claim 1, wherein the plurality of zone types are classified into a high-zone, a medium-zone, and a low-zone, the high-zone, the medium-zone, and the low-zone have different sizes, the high-zone is selected among the plurality of zone types when the speed of the UE is equal to or greater than a first speed threshold, the medium-zone is selected among the plurality of zone types when the speed of the UE is less than the first speed threshold and equal to or greater than a second speed threshold, the low-zone is selected among the plurality of zone types when the speed of the UE is less than the second speed threshold, and the first speed threshold is greater than the second speed threshold.

6. The sidelink communication method according to claim 1, wherein the message is a system information block (SIB).

7. The sidelink communication method according to claim 1, further comprising:
    before receiving the message, transmitting, by the controller, to the base station information regarding a position of the UE and the speed of the UE.

8. An operation method of a base station supporting sidelink communication, comprising:
    generating, by a controller, zone configuration information including configuration information of a plurality of zone types;
    generating, by the controller, resource pool configuration information including configuration information of resource pools for the plurality of zone types;
    transmitting, by the controller, a message including the zone configuration information and the resource pool configuration information to a user equipment (UE); and
    receiving, by the controller, from the UE a zone type selected by the UE among the plurality of zone types and a zone identifier determined by UE based on configuration information of the zone type,
    wherein the plurality of zone types have different zone-sizes, and a zone-size of one zone type is different from a zone-size of other zone type except for the one zone type among the plurality of zone types.

9. The operation method according to claim 8, wherein the plurality of zone types are classified into a high-zone and a low-zone, the high-zone and the low-zone have different sizes, the high-zone is selected among the plurality of zone types when the speed of the UE is equal to or greater than a speed threshold, and the low-zone is selected among the plurality of zone types when the speed of the UE is less than the speed threshold.

10. The operation method according to claim 9, wherein the zone configuration information includes the speed threshold.

11. The operation method according to claim 9, wherein the resource pool configuration information includes configuration information of resource pools for the high-zone and configuration information of resource pools for the low-zone.

12. The operation method according to claim 8, wherein the plurality of zone types are classified into a high-zone, a medium-zone, and a low-zone, the high-zone, the medium-zone, and the low-zone have different sizes, the high-zone is selected among the plurality of zone types when the speed of the UE is equal to or greater than a first speed threshold, the medium-zone is selected among the plurality of zone types when the speed of the UE is less than the first speed threshold and equal to or higher than a second speed threshold, the low-zone is selected among the plurality of zone types when the speed of the UE is less than the second speed threshold, and the first speed threshold is greater than the second speed threshold.

* * * * *